T. M. Chapman,
Saw-Gummer,
No. 37,853.   Patented Mar. 10, 1863.

Witnesses
J. W. Coombs
G. W. Reed

Inventor
T. M. Chapman
per Munn & Co
Attorneys

UNITED STATES PATENT OFFICE.

T. M. CHAPMAN, OF OLD TOWN, MAINE.

IMPROVEMENT IN DEVICES FOR GUMMING SAWS.

Specification forming part of Letters Patent No. 37,853, dated March 10, 1863.

*To all whom it may concern:*

Be it known that I, T. M. CHAPMAN, of Old Town, in the county of Penobscot and State of Maine, have invented a new and Improved Machine for Gumming Saws; and I do hereby declare that the following is a full, clear, and exact description of the same, reference being had to the accompanying drawings, making a part of this specification, in which—

Figure 1:
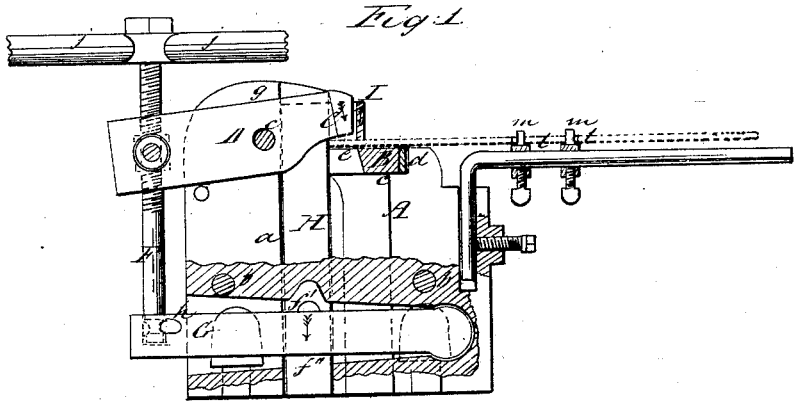
Figure 2:
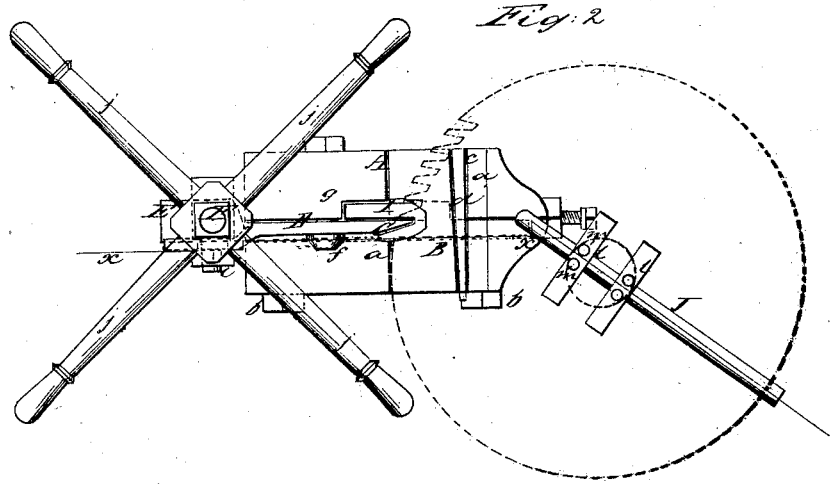

Figure 1 is a side sectional view of my invention, taken in the line $x$ $x$, Fig. 2. Fig. 2 is a plan or top view of the same.

Similar letters of reference indicate corresponding parts in the two figures.

The object of this invention is to obtain a device for gumming saws which will admit of a clean, smooth cut of the die without the liability of the saw slipping or springing under the cutting operation, a contingency of frequent occurrence with all saw-gumming devices which have passed under my observation. To obviate this difficulty I place the movable die or cutter within a clamp, which is arranged in such a manner as to operate in connection with the movable die and firmly clamp the saw or hold it in proper position while the movable die is at its work, the clamp after the cut is made rising after the die is raised, in order to liberate the saw and admit of its being turned or moved to bring the succeeding space between the teeth in line with the movable and the stationary female die in order to receive the succeeding cut.

To enable those skilled in the art to fully understand and construct my invention, I will proceed to describe it.

A represents what may be termed the "stocks" of the device, formed of two solid metal blocks, $a$ $a$, connected together by screw-bolts $d$. In the upper surface of the stock A there is made transversely a recess, $c$, in which a steel bed, B, is fitted and secured by a wedge, $d$. This bed B has a slot, $e$, to form the stationary female die, the slot $e$ corresponding in form to that of the spaces between the teeth of the saw.

C is the male die or cutter, which is formed at one end of a lever, D, the fulcrum-pin $f$ of which passes through a vertical lug or projection $g$ on the stock A. The male die C corresponds in shape to the female die $e$ and is allowed to work into it, the sides of the female die being inclined outward from its top downward, as shown in Fig. 1, so that its top edges will form good cutting-surfaces and at the same time admit of the punchings escaping freely from it.

To the back end of the lever D there is attached a nut, E, in which a vertical screw-rod, F, is fitted and allowed to turn freely. The lower end of the screw-rod F is fitted in the outer end of a lever, G, which is placed in the stock A at its lower part and has a vertical bar, H, attached to which is a pin, $f'$, above and a hook or shoulder, $f''$, beneath the lever G, by means of which the said bar H is operated, as shown in Fig. 1. The bar H is also fitted loosely in the stock A, the former being allowed to rise and fall freely in it, and to the upper end of bar H there is attached a horizontal bar, I, which is curved at its front part so as to encompass the male die C and correspond in form to it, as shown clearly in Fig. 2.

The lower end of the screw-rod F is allowed to turn freely in the lever G, but is connected to it by a pin, $h$, (shown in Fig. 1,) which causes the lever G to rise and fall under the action of the screw-rod F.

The nut E, which is attached to the lever D, and in which the screw-rod F is fitted, is connected by a screw-bolt, $i$, to lever D, to admit of said lever working on its fulcrum-pin $f$ under the action of the screw-rod. The upper end of the screw-rod has levers $j$ attached to it.

J is an arm, the inner end of which is bent down vertically, as shown at $k$, and fitted loosely in the stock A. The other part of this arm J is in a horizontal position and has two slides, $l$ $l$, fitted on it, provided with pins $m$ at its upper surface, which serve as centers for the eyes of circular saws when the latter are to be gummed. (See Fig. 2, in which a circular saw is shown in red outline.) By turning the arm J the teeth of the saw may be successively adjusted underneath the die C, and by turning the screw-rod F the lever G will, when the die C and bar I are both elevated, first be actuated and the bar I forced down on the saw, serving as a clamp to hold it in proper position. Then the clamp I is pressed firmly down upon the saw, the die C, the screw-rod F being still turned, will be forced down the screw-rod, actuating the lever D, and the die will cut out the space between the teeth, the punchings falling down through the slot or female die $e$.

The clamp I effectually prevents the slipping of the saw under the action of the die C and causes the latter to make a smooth, clean cut, leaving sharp angular edges.

Having thus described my invention, what I claim as new, and desire to secure by Letters Patent, is—

1. The male die C, clamp I, and female die e, combined and arranged to operate as and for the purpose herein set forth.

2. The combination of the levers D G, bar H, and screw-rod F, arranged with or applied to the stock A as a particular means for operating the die C and clamp I, as herein described.

T. M. CHAPMAN.

Witnesses:
   J. A. PURINTON,
   G. T. SEWALL.